United States Patent [19]
Mayer

[11] 3,957,589
[45] May 18, 1976

[54] WATER PURIFICATION APPARATUS

[76] Inventor: Frederick G. Mayer, 528 Flax Hill Road, South Norwalk, Conn. 06854

[22] Filed: June 21, 1974

[21] Appl. No.: 481,608

Related U.S. Application Data

[63] Continuation of Ser. No. 205,606, Dec. 7, 1971, abandoned.

[52] U.S. Cl. ............................. 202/185 B; 202/187; 202/189; 202/190
[51] Int. Cl.² ............................................ B01D 3/00
[58] Field of Search ............ 202/182, 185 R, 185 B, 202/187, 189, 190; 159/DIG. 1; 165/122

[56] References Cited
UNITED STATES PATENTS

| | | | |
|---|---|---|---|
| 587,506 | 8/1937 | Pierce et al. | 202/189 |
| 3,278,395 | 11/1966 | Rubinowitz | 202/187 |
| 3,312,600 | 4/1967 | Morton | 202/187 |
| 3,350,279 | 10/1967 | Tolchin | 202/185 X |

Primary Examiner—Jack Sofer

[57] ABSTRACT

A water purifying apparatus having an inner chamber to be filled with contaminated water which is heated by a heating unit to a point where water vapor or steam is created. The steam is evacuated from the chamber at its upper portion and passes downwardly in contact with a condensing wall having cooling vanes disposed on the exterior thereof into a trough provided near the base of the apparatus from whence it is drained off into a container located below the chamber. A cover surrounds the cooling vanes forming an annular air passage and is so constructed that open areas exist near the base of the cover. The cover has an aperture on the top and a fan is disposed below this aperture. Thus cooling air is carried from the open areas near the base of the apparatus upwardly over the vanes and to the aperture at the top where it is continuously evacuated. With this structure the vanes are continuously cooled without affecting the heating operation in the chamber itself which provides the steam and thereby pure water is obtained from the condensed steam in a rapid and efficient manner.

8 Claims, 5 Drawing Figures

INVENTOR
FREDERICK G. MAYER
BY
ARTHUR A. MARCH
ATTORNEY

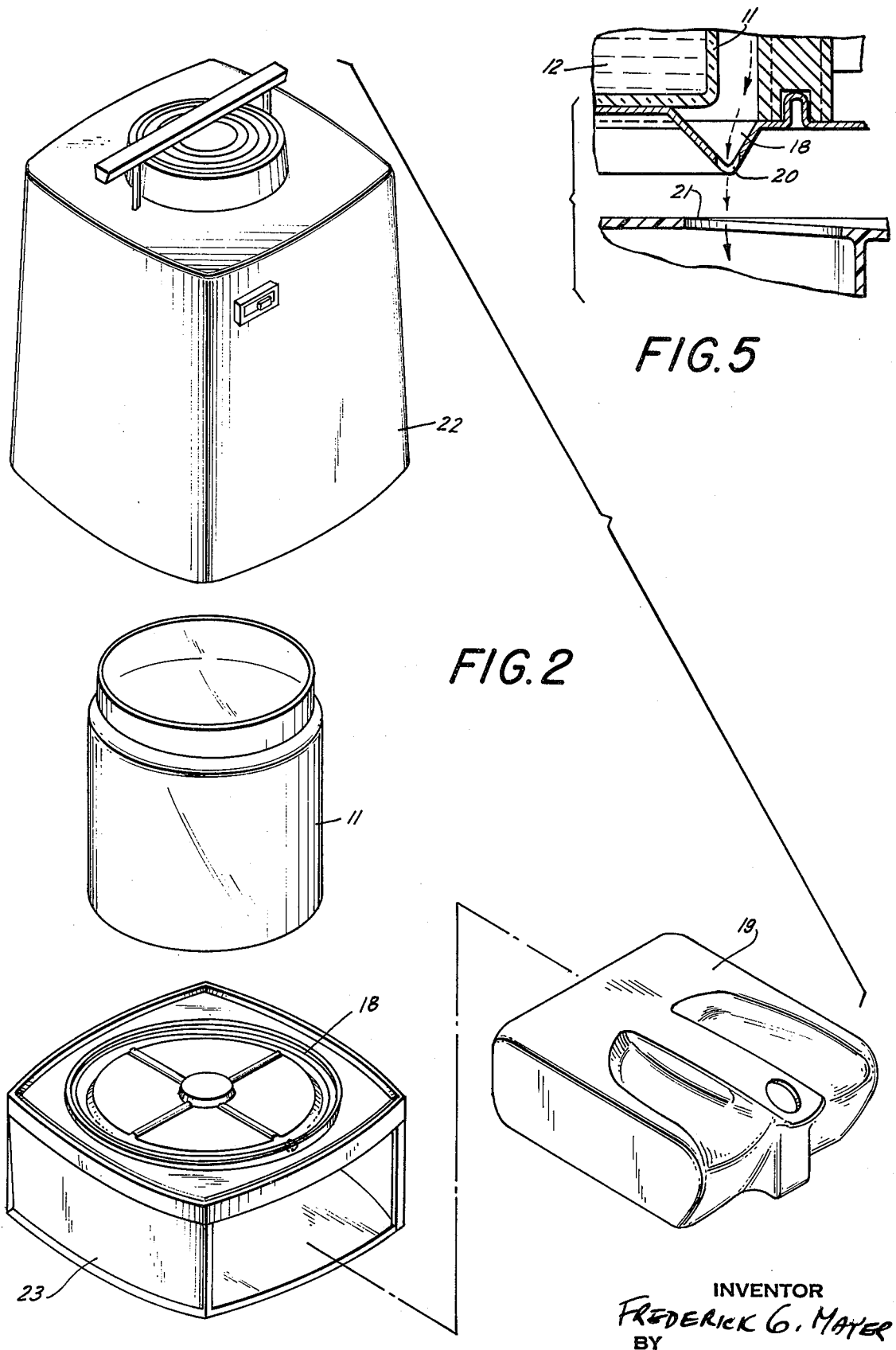

WATER PURIFICATION APPARATUS

This is a continuation of application Ser. No. 205,606 filed Dec. 7, 1971 and now abandoned.

BACKGROUND OF THE INVENTION

The extent of pollution of the drinking water systems of the world and their density of impurities has resulted in many problems which limit the potable water supply. As a result, various types of apparatus have been proposed to purify the water. Such apparatus had either been very complex and expensive or produced clean water in very small quantities, for the most part in quantities insufficient for one day's use and consumption by an average family of uncontaminated water.

It is therefore an object of the present invention to provide a water purifying apparatus which can produce pure water from contaminated water in a relatively rapid manner in sufficient quantities to fill the needs of an average family for one or more days.

It is a further object of the present invention to provide water purifying apparatus in compact form for the desired supply of purified water.

It is a further object of the present invention to provide a desired supply of purified water from impotable contaminated water in an apparatus having very few and inexpensive parts in order that it may be within the economic reach of families most necessary to be served by such purification apparatus.

Other objects and advantages of the present invention are described in greater detail in the following drawings taken in conjunction with the description. It is to be understood that while the invention is being described in detail with regard to one version thereof, such description is not to be considered as a limitation upon the scope of the invention.

DESCRIPTION OF THE INVENTION

FIG. 2 is an exploded view showing the various parts of the apparatus of the present invention in separated form;

FIG. 5 is a sectional view taken along the lines 5—5 of FIG. 4.

Figure 1:
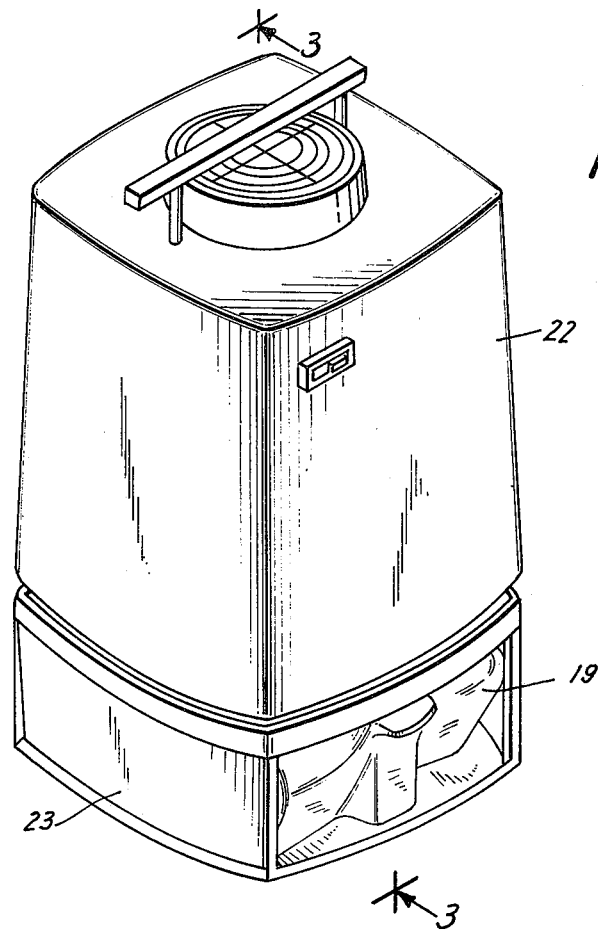
FIG. 1 is a perspective view of the purifying apparatus of the present invention.
Figure 4:
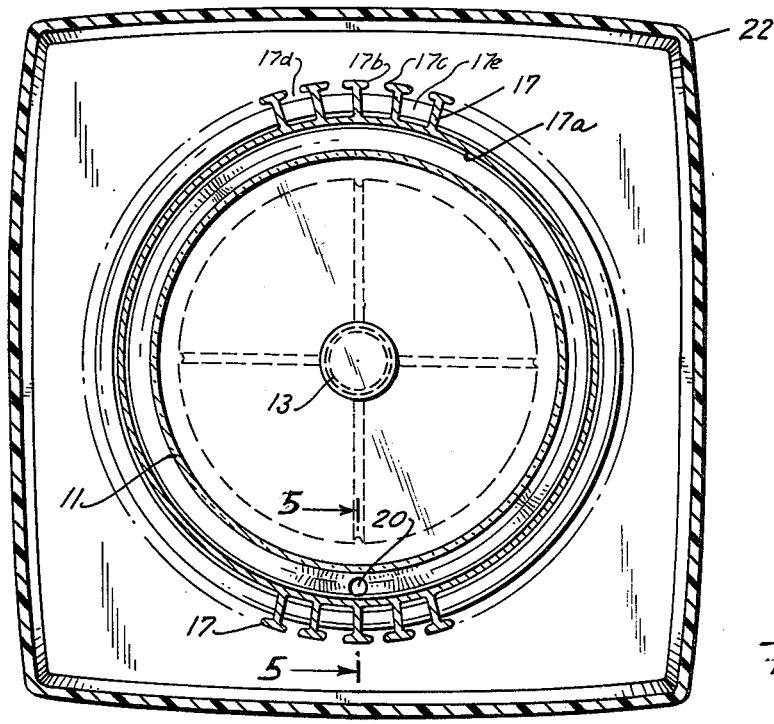
FIG. 4 is a sectional view taken along the lines 4—4 of FIG. 3.
Figure 3:
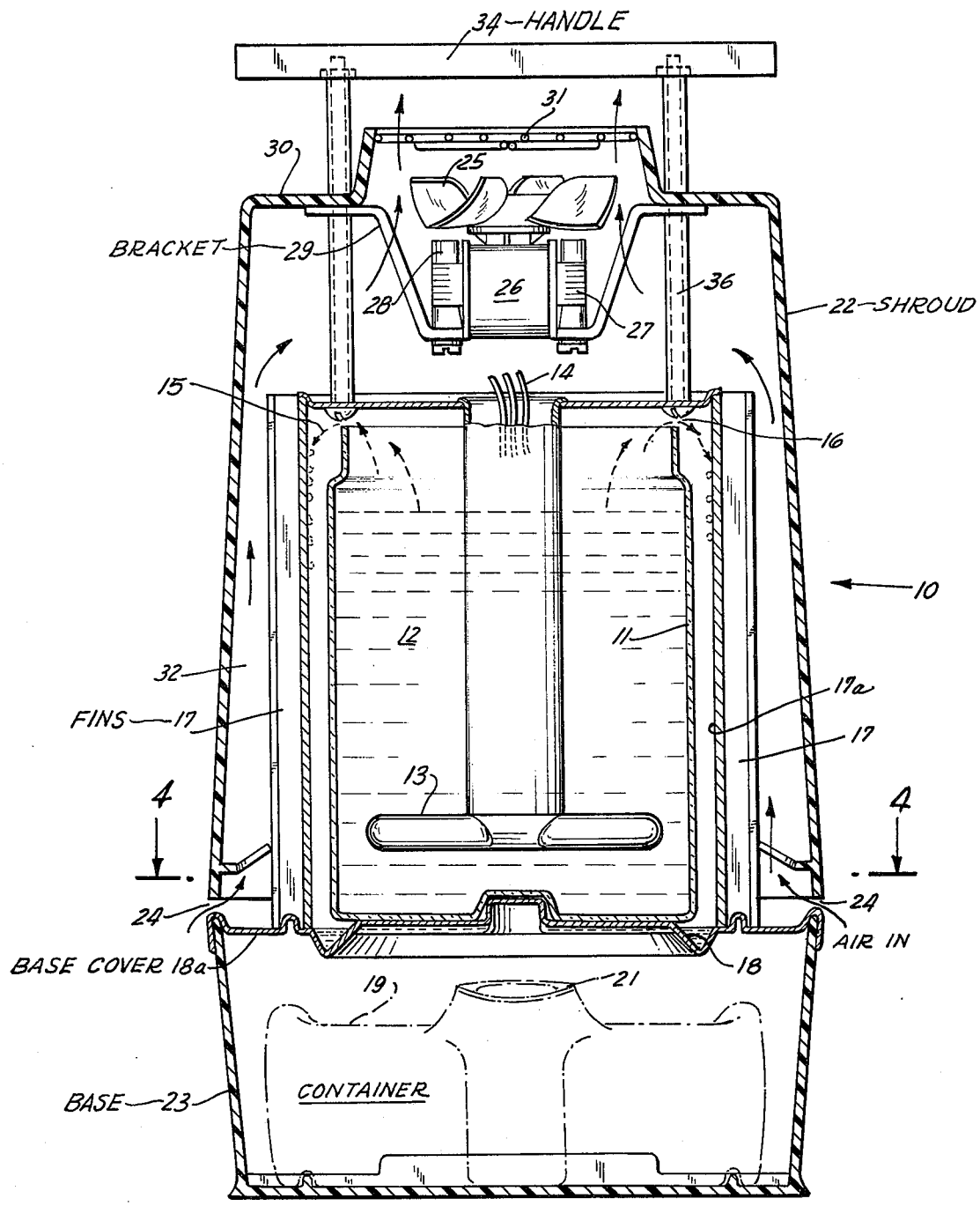
FIG. 3 is a sectional view taken along the lines 3—3 of FIG. 1.

The water purifying apparatus 10 of the present invention comprises a heating chamber 11 into which water 12 contaminated by bacteria or any other type of impurity may be placed. Immersed in the heating chamber is a heating element 13 provided with electrical connectors 14 which lead to a power source, not shown. When the unit is plugged into, as for example, a wall socket, the element 13 will become heated to the extent that the water 12 is brought to its boiling point. The water vapor or steam 15 generated thereby is evaporated through ports 16 disposed at the upper portion of the heating chamber. Vanes 17 are provided for enhanced cooling of the interior surface of cooling annulus 17a and the steam is cooled and condensed to a pure condensate. Cooling vanes or fins 17 T-shaped in cross-section include opposed laterally extending flanges 17b and 17c at their free ends which respectively define with the corresponding flange on the next adjacent cooling fin flow exchange restricting slots 17d therealong for the subdivided flow spaces 17e formed between the adjacent vanes or fins 17. An inclined trough 18 is disposed in the base cover 18a of the unit over a container 19. The inclined trough is provided with an outlet 20 leading to the mouth 21 of the container 19. As the condensed steam, which is now purified water, passes into the inclined trough 18, it runs from the trough through the outlet 20 thereof and into the container 19 through mouth 21.

In prior practice only a relatively small amount of water could be collected in the container 19 because of the time necessary to condense the steam or water vapor into sufficient quantities of pure water collected in the trough 18 to pass into the container. It is quite desirable to collect at least that quantity of water which is necessary to supply the average needs of a family in areas where a potable water supply is most difficult to obtain and necessary to provide unpolluted water. According to the present invention means have been provided to permit large quantities of pure water to be obtained from contaminated water in an efficient and economic manner. This has been accomplished by the utilization of a shroud 22 which is so disposed that it rests above the base 23 into which the container 19 is inserted. Thus provision is made for defining a forced air passage including openings 24 surrounding the base of the container. While these open areas have been shown in a specific way, that is, by a gap between the shroud 22 and the base 23, it will be understood that such open areas may be provided with the use of apertures in the container itself or by any other suitable means for the purposes hereinafter set forth.

According to the invention a fan 25 is carried by a motor 26 located above the heating chamber 11. The fan structure is mounted by means of an attachment 27 and 28 which is secured to a bracket 29 carried underneath a shoulder 30 provided in the shroud 22. The top of the container adjacent the shoulder has vents 31. Thus when the fan is in its operating function it draws air through the open areas 24 along the annular air passage 32 between the shroud 22 and the fins 17 which air is emitted through the vents 31. Thus according to the present invention, the steam passing in contact with the finned surface 17a is rapidly cooled and condensed as it is emitted from the heating chamber. A large quantity of potable water is thereby provided overnight to supply the needs of an average family for one or more ensuing days from one economic and inexpensively operated unit. A handle 34 secured through the shoulder 30 and bracket 29 is fastened by rods 36 to the shroud 22 and heat exchanging surface 17a. Thus exposure of container 11 is rapid and convenient for replenishing water supply 12 therein.

In operation the apparatus is plugged into a conventional electric outlet after filling the chamber 11 with contaminated water 12. The element 13 heats the water into steam or water vapor 15 which is emitted through the outlet 16 passing in contact with the surface 17a equipped with vanes 17. Steam or water vapor 15 is rapidly cooled and condensed since the vanes 17, and thus surface 17a, are rapidly chilled by the passage of a forced stream of cooling air from the inlets 24 drawn by the fan 25 and passing out through the vents 31. The purified condensate passes into the trough 18 and through the outlet 20 into the container 19 via the mouth 21. The container is so constructed that it may be stored with facility in a cool place to provide drinking water or clean water for any other needed purpose.

Thus the present invention accomplishes a water purification in quantity to supply the needs of the average family for a day or more while utilizing only a small amount of current for heating the coil and operating the fan. The water is potable because impurities, which are not emitted in the form of steam, are collected in sediment form at the bottom of the chamber 11 which can be easily washed when the unit is disassembled as it may be with great facility. In accordance with the present invention a large quantity of usable drinking water may be supplied from contaminated water to fill the needs of the user for several days from one day's operation of the apparatus.

With the use of the apparatus of the present invention over 300% more potable water is obtainable over the same time period than with prior art units of comparable size.

It is to be understood that while the invention has been described in detail with regard to the specifics thereof this is not intended in any way to limit the invention which embodies modifications and variations which may be made by those skilled in the art without departing from the scope of the appended claims.

To summarize briefly, the instant invention relates to an apparatus for supplying substantially pure water from an impure source which includes a chamber for holding a quantity of impure water, means for converting the same to water vapor or steam, a heat exchanging surface which is maintained at a temperature below the boiling point of water for condensing the water vapor, means for collecting the condensate, and means for circulating cooling air in intimate contact with said heat exchange surface. The exterior of the heat exchanging surface is preferably provided with fins to increase the cooling rate thereof and the circulating air is forced by means of a fan provided in the upper portion of the apparatus.

What is claimed is:

1. Apparatus for converting contaminated water into substantially pure water which comprises:
    a base cover;
    a vertically disposed, cylindrical, heatable water holder on said base cover for heat volatilizing water to vapor form and having a water vapor exit opening at its upper end;
    a perimetric condensed water receiving trough formed in said base cover outwardly of said water holder for recovering so-volatilized water upon condensation;
    a vertically axised, enclosing heat exchanger removably positioned on said base cover in sealing engagement therewith outwardly of said trough and in surrounding spaced relation to said water holder, and defining a flow directing condensation area on the interior surface thereof for condensing so-volatilized water emanating from said water vapor exit opening and leading to said trough and a heat dissipation area on the exterior surface of said exchanger including a plurality of cooling fins T-shaped in cross-section with radially outstanding webs from said exterior surface coplanar with the exchanger axis and spaced apart from one another to define therebetween corresponding subdivided cooling air flow spaces;
    a shroud removably positioned on said heat exchanger in surrounding spaced relation thereto and defining therewith an encompassing peripheral positive flow coolng air passageway outwardly confining the exterior surface of said heat exchanger and fins and in flow exchange communication therealong with said subdivided flow spaces;
    air entrance and exit means for said air passageway in opposite ends of said shroud; and
    air moving means operatively positioned on said shrouder for inducing positive flow of cooling air from said entrance to said exit means through said air passageway and across the exterior surface of said heat exchanger and said cooling fins and in flow exchange with the subdivided spaces between said cooling fins, for enhanced accelerated dissipation and removal of the heat from the so-volatilized water as it is condensed on said condensing area.

2. Apparatus according to claim 1 wherein said trough is provided with a drain outlet, and a removable condensate collecting means is disposed in said base and operatively positioned to collect via said drain outlet the condensate received in said trough.

3. Apparatus according to claim 1 wherein said shroud and heat exchanger are interconnected for common removable positioning on said base cover.

4. Apparatus according to claim 1 wherein the juxtapositioning of the flanges of said cooling fins define at their free edges peripherally distributed flow exchange restricting slots for said subdivided flow spaces.

5. Apparatus according to claim 1 wherein said heat exchanger is provided with a heating element operatively disposed to extent through the vapor exit opening of the water holder and into same for immersion into the water therein to heat volatilize such water.

6. Apparatus according to claim 5 wherein said heating element and air moving means are electrically operated.

7. Apparatus for converting contaminated water into substantially pure water which comprises:
    a base cover;
    an upright heatable water holder removably positioned on said base for heat volatilizing water to vapor form and having a water vapor exit opening at the upper portion thereof;
    an intermediately disposed perimetric condensed water receiving trough in said base cover outwardly of said water holder for recovering so-volatilized water vapor upon condensation and provided with a drain outlet;
    a removable condensate collecting means disposed in said base and operatively positioned to collect via said drain outlet the condensate received in said trough;
    an upright enclosing heat exchanger removably positioned on said base cover in sealing engagement therewith outwardly of said trough and in surrounding spaced relation to said water holder, and defining a vapor flow directing condensation area on the interior surface thereof for condensing so-volatilized water emanating from said water vapor exit opening and leading to said trough and a heat dissipation area on the exterior surface thereof including a plurality of upright cooling fins extending radially outwardly from said exterior surface and laterally spaced apart from one another to define therebetween corresponding subdivided upright cooling air flow spaces, said cooling fins being T-shaped in cross-section each including opposed laterally extending upright flanges at their free ends which respectively define with the corresponding flange on the next adjacent cooling fin upright flow exchange restricting slots therealong for said subdivided upright flow spaces;

an upright shroud interconnected with said heat exchanger for common removable positioning therewith on said base cover and disposed in surrounding spaced relation to said heat exchanger and said cooling fins and defining therewith an encompassing upright peripheral positive flow cooling air passageway outwardly confining the exterior surface of said heat exchanger and in restricted flow exchange communication therealong with said subdivided flow spaces through said slots;

a downwardly depending heating element on the upper portion of said heat exchanger and operatively disposed to extend removably into the vapor exit opening of the water holder for immersion into the water therein to heat volatilize such water;

external air entrance means for said air passageway at the lower portion of said shroud and correspondingly operatively opposed exit means at the upper portion of said cover; and an air fan supported in the upper portion of said cover and operatively positioned adjacent said exit means for inducing positive flow of cooling air from said entrance to said exit means through said air passageway and across the exterior surface of said heat exchanger and said cooling fins and in restricted flow exchange with the subdivided spaces between said cooling fins, for enhanced accelerated dissipation and removal of the heat from the so-volatilized water as it is condensed on said condensing area.

8. Apparatus according to claim 7 wherein said heating element and air fan are electrically operated.

* * * * *